(12) United States Patent
Hacault

(10) Patent No.: US 11,280,124 B2
(45) Date of Patent: Mar. 22, 2022

(54) LOCKING HINGE APPARATUS FOR AIRCRAFT DOORS

(71) Applicant: The Boeing Company, Chicago, IL (US)

(72) Inventor: James Paul Hacault, Winnipeg (CA)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 15/872,693

(22) Filed: Jan. 16, 2018

(65) Prior Publication Data

US 2019/0218840 A1    Jul. 18, 2019

(51) Int. Cl.
*E05D 11/10* (2006.01)
*E05D 3/02* (2006.01)
(Continued)

(52) U.S. Cl.
CPC ........ *E05D 11/1007* (2013.01); *B64C 1/1446* (2013.01); *B64D 29/06* (2013.01);
(Continued)

(58) Field of Classification Search
CPC ......... Y10T 16/54024; Y10T 292/1055; Y10T 292/0911; Y10T 292/0926; Y10T 292/0928; Y10T 292/0932; Y10T 292/1039; Y10T 292/1051; Y10T 292/1052; Y10T 292/1059; Y10T 292/1008; Y10T 292/216; Y10T 16/54026; E05D 11/1007
See application file for complete search history.

(56) References Cited

U.S. PATENT DOCUMENTS 976,392 A    11/1910   Paynter
1,062,623 A    5/1913   Waters
(Continued)

FOREIGN PATENT DOCUMENTS

FR    2996580 A1 *  4/2014  ......... E05D 11/1057

OTHER PUBLICATIONS

United States Patent and Trademark Office, "Notice of Allowance and Fee(s) Due," issued in connection with U.S. Appl. No. 15/843,224, dated Jan. 7, 2020, 5 pages.
(Continued)

*Primary Examiner* — Victor D Batson
*Assistant Examiner* — Matthew J Sullivan
(74) *Attorney, Agent, or Firm* — Hanley, Flight & Zimmerman, LLC

(57) ABSTRACT

Locking hinge apparatus for aircraft doors are disclosed. An example locking hinge apparatus includes a hinge base to couple to a frame of an aircraft. A hinge gooseneck is to pivotally couple a door to the hinge base. The hinge gooseneck is to allow the door to move between a closed position and an open position relative to the frame. A lever is pivotally coupled to the hinge base. The lever is to pivot relative to the hinge base between a first rotational direction and a second rotational direction opposite the first rotational direction. The lever includes a lock to engage a portion of the hinge gooseneck to prevent rotational movement of the door relative to the frame when the door is in the open position. A biasing element is to urge the lever in the first rotational direction.

23 Claims, 15 Drawing Sheets

(51) Int. Cl.
  *E05D 5/06* (2006.01)
  *E05D 5/02* (2006.01)
  *B64C 1/14* (2006.01)
  *B64D 29/06* (2006.01)

(52) U.S. Cl.
  CPC ............. *E05D 3/02* (2013.01); *E05D 5/0207* (2013.01); *E05D 5/062* (2013.01); *E05D 2005/067* (2013.01); *E05Y 2201/22* (2013.01); *E05Y 2201/232* (2013.01); *E05Y 2900/502* (2013.01); *E05Y 2900/531* (2013.01)

(56) References Cited

U.S. PATENT DOCUMENTS

| | | | |
|---|---|---|---|
| 1,294,044 A | 2/1919 | Buckwalter et al. | |
| 1,508,013 A | 9/1924 | De Waters | |
| 1,603,408 A | 10/1926 | Rickenbacher | |
| 1,603,409 A | 10/1926 | Rickenbacher | |
| 1,758,309 A | 5/1930 | Block | |
| 2,671,928 A * | 3/1954 | Bright | E05D 11/1007 16/333 |
| 2,779,051 A * | 1/1957 | Ragsdale | E05D 11/1085 16/333 |
| 2,799,889 A * | 7/1957 | Ragsdale | E05D 11/1085 16/333 |
| 3,315,298 A | 4/1967 | Strien et al. | |
| 3,378,881 A | 4/1968 | Hentzi et al. | |
| 3,434,096 A * | 3/1969 | Pusateri, Jr. | F16L 37/20 235/139 R |
| 3,446,524 A * | 5/1969 | Barry | E05B 65/00 292/223 |
| 3,448,486 A | 6/1969 | Wright | |
| 3,469,277 A * | 9/1969 | Brown | E05D 11/1014 16/324 |
| 3,643,292 A | 2/1972 | Mayer | |
| 3,879,146 A | 4/1975 | Mayer | |
| 3,918,755 A * | 11/1975 | Murphy | E05D 11/1007 292/256 |
| 3,969,788 A | 7/1976 | McCullough | |
| 4,076,290 A * | 2/1978 | Sweger | B63B 19/24 292/256.5 |
| 4,085,969 A | 4/1978 | Nakane et al. | |
| 4,127,215 A * | 11/1978 | Morrison | B64C 1/1407 220/259.3 |
| 4,230,351 A * | 10/1980 | Bisbing | E05C 3/08 292/223 |
| 4,234,221 A * | 11/1980 | Przybylinski | F16J 13/18 292/210 |
| 4,263,853 A | 4/1981 | Robertson | |
| 4,796,331 A * | 1/1989 | White | E05D 7/086 16/324 |
| 5,058,239 A | 10/1991 | Lee | |
| 5,068,946 A * | 12/1991 | Marescot | B64D 29/06 16/333 |
| 5,169,257 A * | 12/1992 | Liou | A47C 20/045 16/333 |
| 5,237,709 A * | 8/1993 | Byerly | E03D 5/00 4/323 |
| 5,287,596 A | 2/1994 | Chen et al. | |
| 5,392,826 A * | 2/1995 | Saville | B64D 11/02 137/800 |
| 5,711,053 A | 1/1998 | Hafner | |
| 6,353,967 B1 | 3/2002 | Escobar et al. | |
| 6,892,843 B2 * | 5/2005 | Schillaci | E05C 17/24 180/274 |
| 8,347,554 B2 | 1/2013 | Uto et al. | |
| 8,413,382 B2 | 4/2013 | Uto et al. | |
| 8,707,521 B1 | 4/2014 | Mack | |
| 8,732,906 B1 | 5/2014 | Van Gennep | |
| 9,725,100 B2 * | 8/2017 | Early | B61D 7/16 |
| 2004/0093692 A1 | 5/2004 | Cude et al. | |
| 2009/0031531 A1 * | 2/2009 | Chang | G06F 1/1679 16/333 |
| 2019/0186187 A1 | 6/2019 | Wright | |

OTHER PUBLICATIONS

United States Patent and Trademark Office, "Non-Final Office Action," issued in connection with U.S. Appl. No. 15/843,224, dated Sep. 25, 2019, 9 pages.

* cited by examiner

LOCKING HINGE APPARATUS FOR AIRCRAFT DOORS

FIELD

The present disclosure relates generally to hinges and, more particularly, to locking hinge apparatus for aircraft doors.

BACKGROUND

Aircraft employ access doors or panels to perform maintenance operations one or more components of the aircraft. To facilitate maintenance operations, some aircraft doors (e.g., strut doors) employ a locking hinge that automatically locks movement of the doors to an open position upon moving the door to a fully open position.

SUMMARY

An example locking hinge apparatus includes a hinge base to couple to a frame of an aircraft. A hinge gooseneck is to pivotally couple a door to the hinge base. The hinge gooseneck is to allow the door to move between a closed position and an open position relative to the frame. A lever is pivotally coupled to the hinge base. The lever is to pivot relative to the hinge base between a first rotational direction and a second rotational direction opposite the first rotational direction. The lever includes a lock to engage a portion of the hinge gooseneck to prevent rotational movement of the door relative to the frame when the door is in the open position. A biasing element is to urge the lever in the first rotational direction.

An example locking hinge disclosed herein includes a hinge base to couple to a frame of an aircraft. A hinge gooseneck is pivotally coupled to the hinge base. The hinge gooseneck to couple a door of the aircraft to the hinge base. A lock assembly is to lock a position of the door in an open position when the door is moved to a fully open position. The lock assembly includes a lever pivotally coupled to the hinge base. The lever is to pivot relative to the hinge base between a first rotational direction and a second rotational direction opposite the first rotational direction. The lever includes a cam surface to be engaged by the hinge gooseneck when the door approaches the fully open position. The hinge gooseneck is to cause the lever to pivot in the second rotational direction when the cam surface is engaged by the hinge gooseneck. A biasing element is to urge the lever toward the first rotational direction.

An example apparatus disclosed herein includes means for pivotally coupling a door to a frame of an aircraft. The means for pivotally coupling includes first means for attaching to the door and second means for attaching to the frame. The first means for attaching is pivotally coupled to the second means for attaching to enable rotation of the door relative to the frame between an open position and a closed position. The example includes means for locking pivotal movement of the door relative to the frame when the door is in an open position. The means for locking is rotatably coupled to the second means for attaching. The means for locking to rotate relative to the second means for attaching between a first rotational direction and a second rotational direction opposite the first rotational direction.

An example method includes: rotating a hinge gooseneck relative to a hinge base about a first pivot axis between a closed position and an open position; in response to rotating the hinge gooseneck relative to the hinge base from the closed position to the open position, pivoting a lever in a second rotational direction about a second pivot axis different than the first pivot axis via an engagement between a protrusion of the hinge gooseneck and the lever as the hinge gooseneck approaches the open position; and biasing the lever in a first rotational direction opposite the second rotational direction about the second pivot axis to cause a recess of the lever to engage the protrusion of the hinge gooseneck to lock pivotal movement of the hinge gooseneck relative to the hinge when the hinge gooseneck is in the open position. In some examples, the method also includes rotating the lever in the second rotational direction to cause the lever to release the protrusion of the hinge gooseneck and allow rotation of the hinge gooseneck to move to the closed position.

Figure 1:
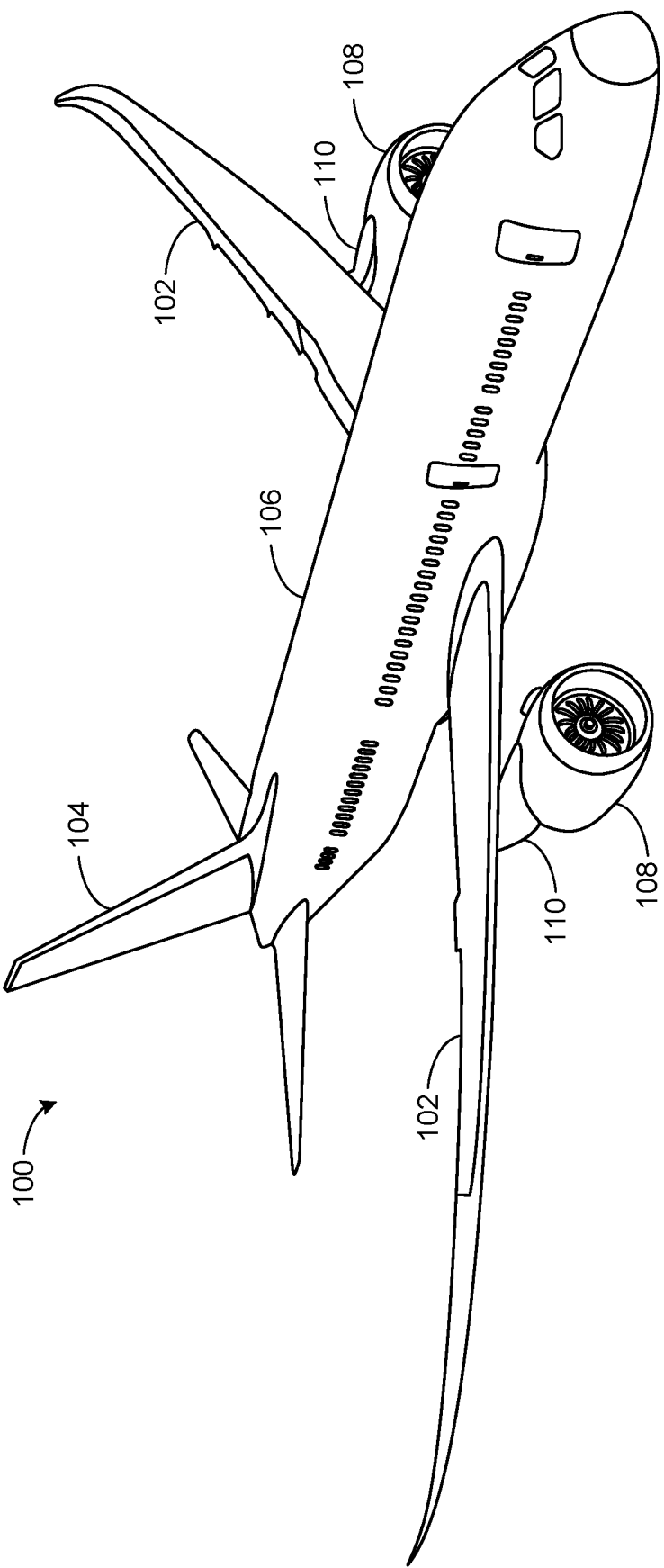
FIG. 1 illustrates an example aircraft implemented with an example hinge assembly system in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DESCRIPTION

Known aircraft employ doors (e.g., strut doors) having locking hinges that automatically lock the doors in an open position upon fully opening the doors. Known locking hinges employ a hinge base that couples or attaches to a frame of an aircraft and a hinge gooseneck that couples to a door of the aircraft. The hinge gooseneck is movably coupled to the hinge base. Such known hinges employ a locking mechanism that includes a thumb lever, a link, a locking pin and a torsion spring. The locking pin typically travels over a cam-like surface on the hinge base and snaps into a recess on the hinge base to lock the position of the door in the open position. To unlock the locking mechanism of such known locking hinges and enable the door to move to a closed position, the thumb lever is depressed to cause the link and the locking pin to translate out of engagement with the recess. Such known locking hinges require the use of an extra link and a set of slots on the hinge gooseneck that are difficult to machine. Additionally, to reduce wear of the latching components of the locking hinges, the hinge base and the hinge gooseneck of known locking hinges are fabricated from cast steel, which increases manufacturing costs and/or weight.

Example locking hinges disclosed herein may be employed with aircraft doors and/or panels. Specifically, to facilitate maintenance operations, some aircraft doors (e.g., strut doors) employ the locking hinges disclosed herein to automatically lock movement of the doors to an open position upon moving the door to a fully open position. Some example locking hinges disclosed herein employ a locking pin attached to the hinge gooseneck that rides along a cam surface located on a latch lever. At a fully open position, a biasing element causes a recess on the cam surface of the latch lever to engage the locking pin located on the gooseneck. To release the hinge, the latch lever may be actuated (e.g., pulled back by an operator) to release the locking pin and enable the door to move to a closed position.

Unlike known locking hinges, the example locking hinge apparatus disclosed herein provide a latching mechanism (e.g., a lever) coupled to a hinge base as opposed to a hinge gooseneck. Providing the locking mechanism on the hinge base as opposed to the hinge gooseneck enables unlatching of the locking mechanism via rotation of the latch lever instead of translation via a link. Eliminating the link to release the locking pin reduces manufacturing costs. Additionally, supporting the latching mechanism via the hinge base reduces or eliminates wear on surfaces of the hinge gooseneck, which enables the hinge gooseneck to be manufactured from machined aluminum instead of cast steel, thereby reducing both the weight and manufacturing costs of the assembly. Additionally, example locking hinges disclosed herein may be retrofit to doors of aircraft.

FIG. 1 illustrates an example aircraft 100 having a hinge assembly constructed in accordance with the teachings of this disclosure. The aircraft 100 of the illustrated example includes wings 102 and an empennage 104 attached to a fuselage 106. Engines 108 are coupled to the wings 102 of the aircraft 100 via respective pylons 110. The aircraft 100 of the illustrated example may include one or more doors or access panels (e.g., hinged covers) to access compartments in the fuselage 106, the wings 102, the pylons 110, etc. The one or more doors or access panels of the aircraft 100 of the illustrated example may be implemented with example an example hinge assembly in accordance with teachings of this disclosure.

Figures 2, 2A:
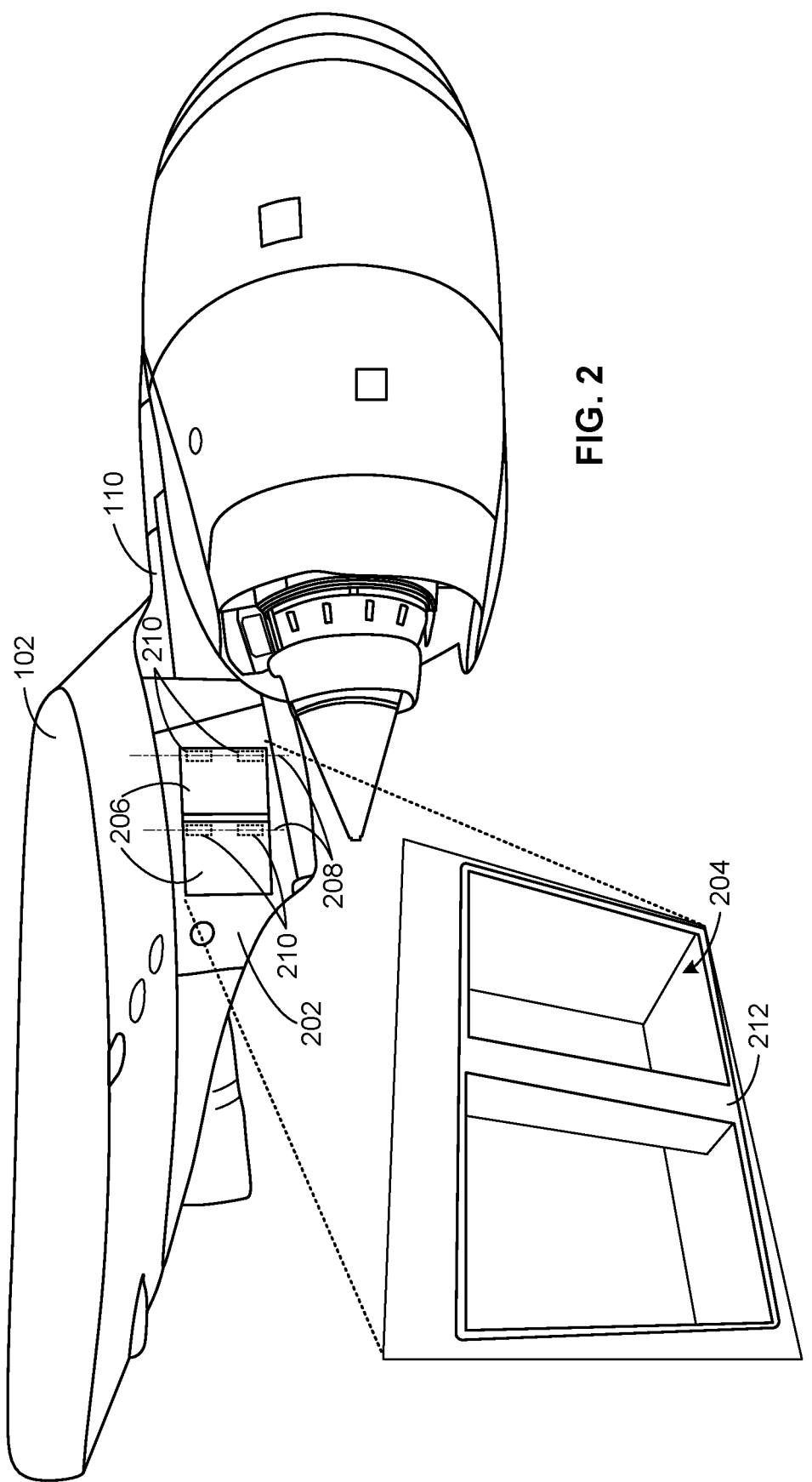
FIG. 2 is a partial, perspective view of the example aircraft of FIG. 1.
FIG. 2A is an enlarged portion of the example aircraft of FIG. 2 with doors of an aft strut fairing removed.

FIG. 2 is partial, enlarged view of the example aircraft 100 of FIG. 1. Specifically, FIG. 2 is an enlarged view of the pylon 110 of FIG. 1. Referring to FIG. 2, the pylon 110 of the illustrated example includes an aft strut fairing 202. To allow access to a compartment 204 of the aft strut fairing 202, the aft strut fairing 202 of the illustrated example employ one or more doors 206 (e.g., strut doors). The doors 206 of the illustrated example are movable between a closed position to seal the compartment 204 and an open position to allow access inside the compartment 204. FIG. 2A is an enlarged portion of the aft strut fairing 202 shown without the doors 206 to show the compartment 204.

To enable the doors 206 to rotate or pivot about respective pivot axes 208, the doors 206 of the illustrated example employ one or more hinges 210. In particular, the hinges 210 of the illustrated example pivotally couple the doors 206 to a frame 212 of the aft strut fairing 202. As described in greater detail below, the hinges 210 of the illustrated example enable the doors 206 to lock in open positions. Specifically, to facilitate maintenance operations, the hinges 210 of the illustrated example lock movement of the doors 206 to a fully open position automatically when the doors 206 move to a fully open position. As used herein, locking the doors 206 in the open position means that the doors 206 can open fully to allow access to the compartment 204 and remain open without support from an operator or structure other than the hinges 210. The hinges 210 of the illustrated example maintain the doors 206 in their respective open positions during maintenance operations under anticipated load conditions (e.g., gust loads, handling loads, etc.). The doors 206 of the aft strut fairing 202 may be positioned on outboard side of the pylon 110 and/or on inboard side of the pylon 110. Thus, each pylon 110 may include eight (8) hinges 210 (e.g., four (4) hinges for the doors 206 located on the outboard side of the pylon 110 and four (4) hinges for the doors 206 located on the inboard side of the pylon 110).

Figure 3:
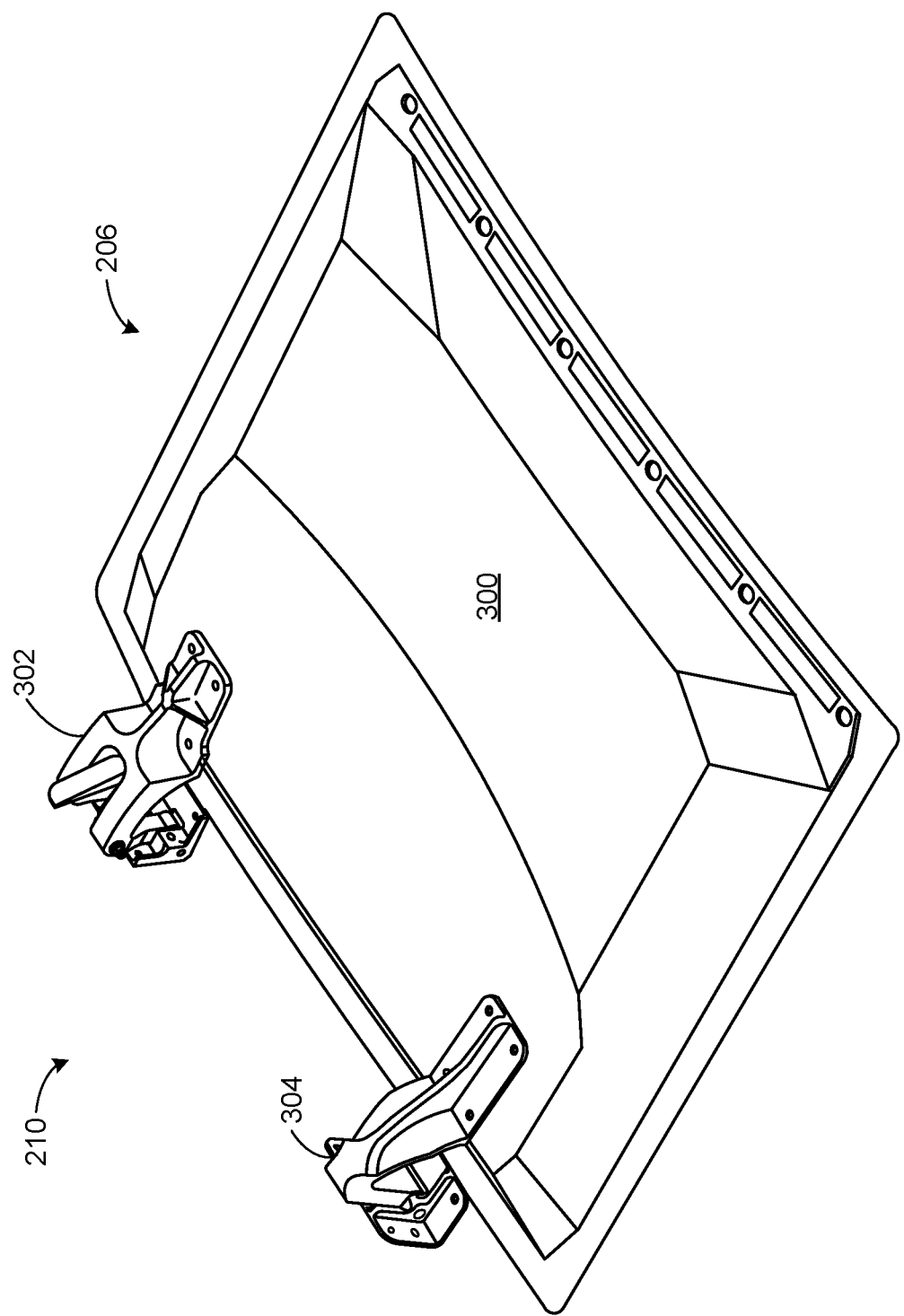
FIG. 3 is perspective view of example hinges disclosed herein coupled to an example door of the example aircraft of FIGS. 1 and 2.

FIG. 3 is a perspective view of the door 206 of the aft strut fairing 202 of FIG. 2. Specifically, FIG. 3 illustrates an interior side 300 of the door 206 showing the hinges 210. The hinges 210 of the illustrated example include a locking hinge 302 and a non-locking hinge 304. The locking hinge 302 and the non-locking hinge 304 pivotally couple the door 206 to the frame 212 of the aft strut fairing 202. In some examples, the locking hinge 302 and/or the non-locking hinge 304 provides means for pivotally coupling the door 206 to the frame 212 of the aircraft 100 to enable rotation of the door 206 relative to the frame 212 between an open position (e.g., a fully open position) and a closed position.

Figure 4:
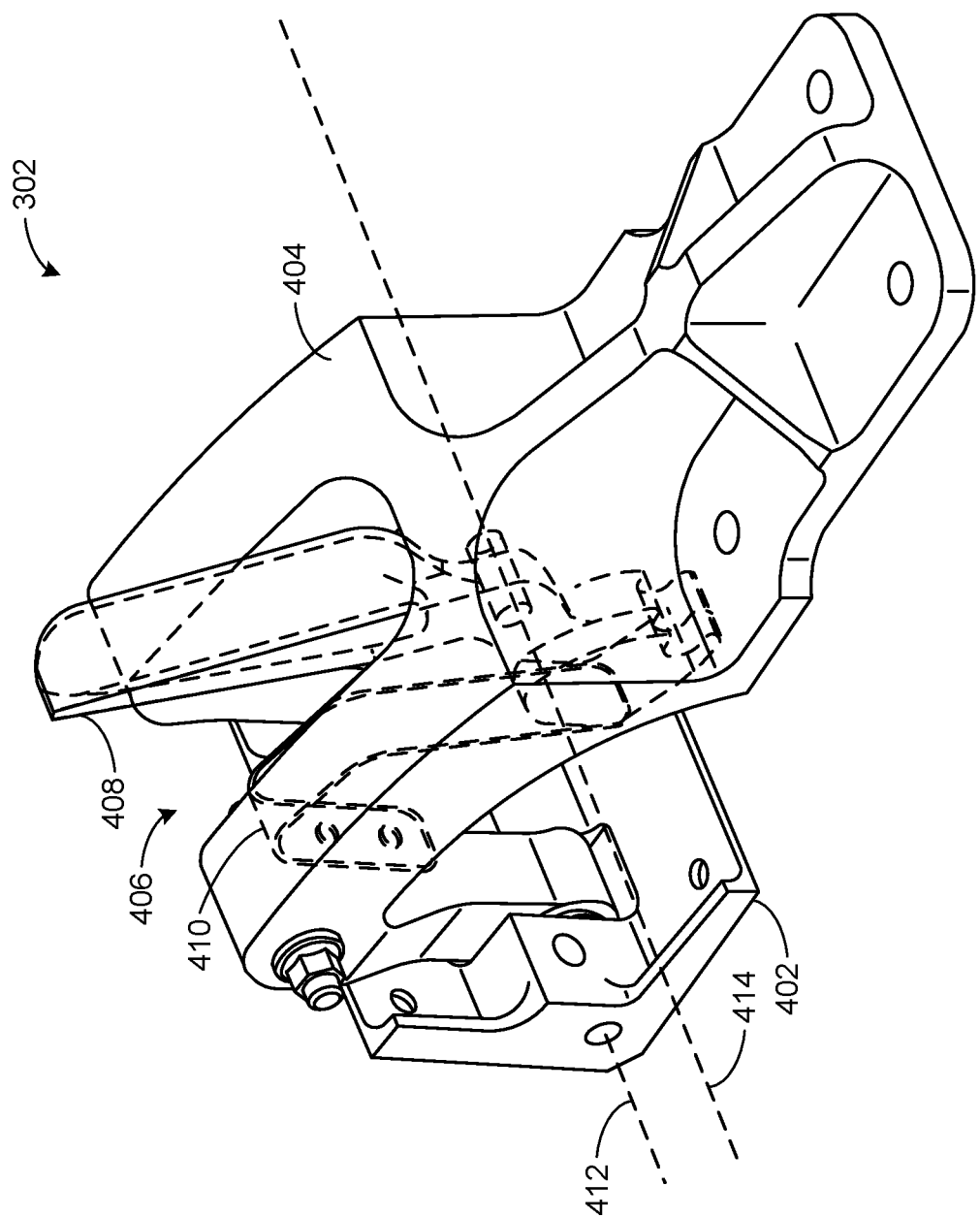
FIG. 4 is a perspective, assembly view of an example locking hinge of the example hinges of FIGS. 1-3.

FIG. 4 is a perspective view of the locking hinge 302 of FIG. 3. The locking hinge 302 of the illustrated example includes a hinge base 402, a hinge gooseneck 404 and a lock assembly 406. The lock assembly 406 of the illustrated example includes a lever 408 and a biasing element 410. As described in greater detail below, the hinge gooseneck 404 of the illustrated example rotates relative to the hinge base 402 and/or the lever 408 about a first pivot axis 412. The lever 408 of the illustrated example rotates or pivots relative to the hinge base 402 and/or the hinge gooseneck 404 about a second pivot axis 414. The first pivot axis 412 is substantially parallel and offset relative to the second pivot axis 414. As used herein, the term substantially parallel means approximately parallel and/or perfectly parallel. In some examples, the hinge base 402 provides means for attaching to the frame 212 and the hinge gooseneck 404 provides means for attaching to the door 206. In some examples, the biasing element 410 provides means for biasing or urging the lever 408. For example, the biasing element 410 may include a spring such as, for example, a leaf spring, a coil spring, a torsion spring and/or any other type of spring.

The hinge base 402, the hinge gooseneck 404 and/or the lever 408 of the illustrated example may be formed from aluminum, steel (e.g., cast steel, stainless steel), titanium, alloys, and/or any other suitable material(s). The hinge base 402, the hinge gooseneck 404 and/or the lever 408 of the illustrated example may be formed via machining, casting, injection molding and/or any other suitable manufacturing processes. For example, the hinge base 402, the hinge gooseneck 404 and/or the lever 408 may be formed or manufactured via machined aluminum.

Figure 5A:
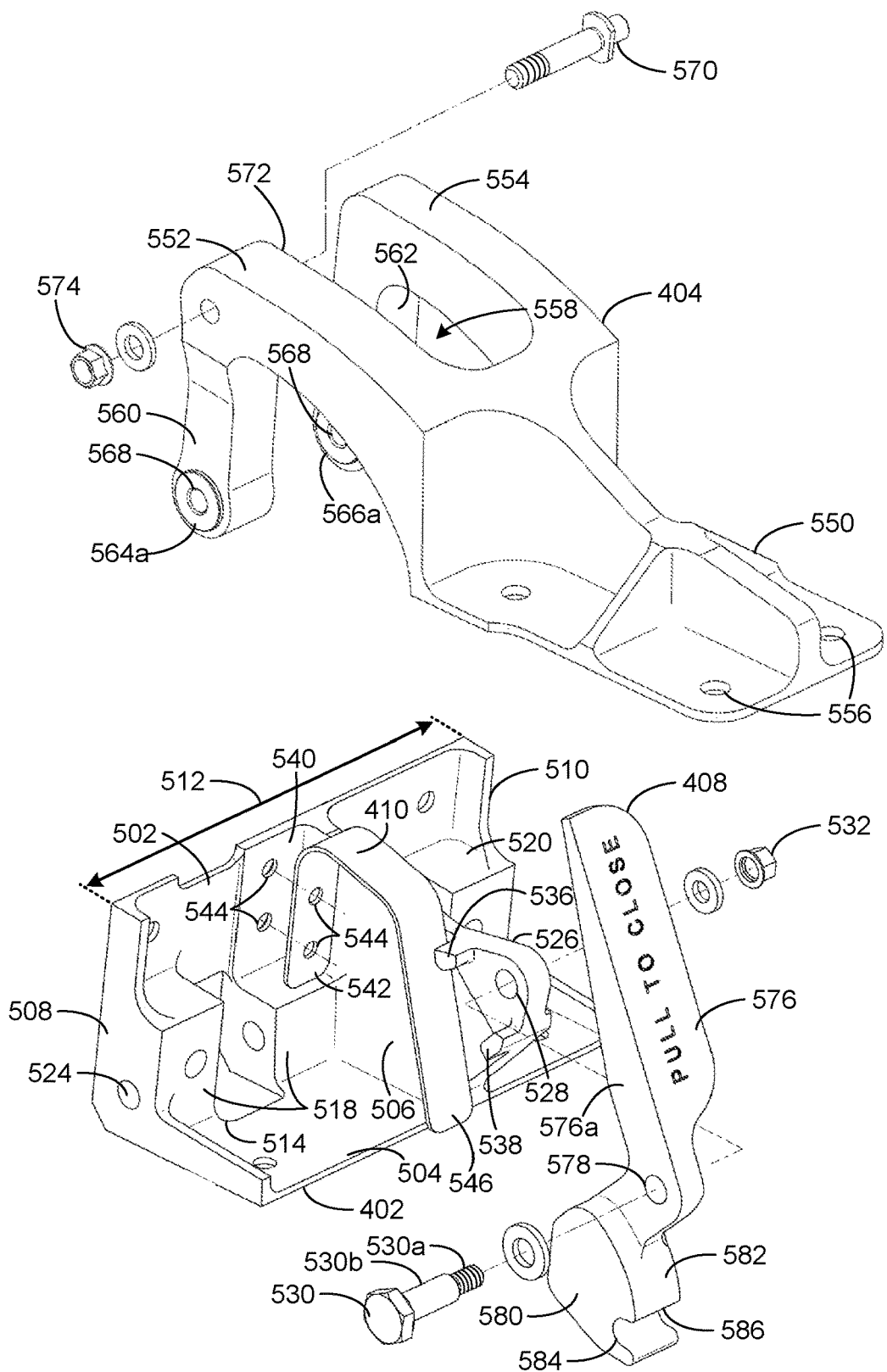
FIG. 5A is an exploded view of the example locking hinge of FIG. 4.
Figure 5B:
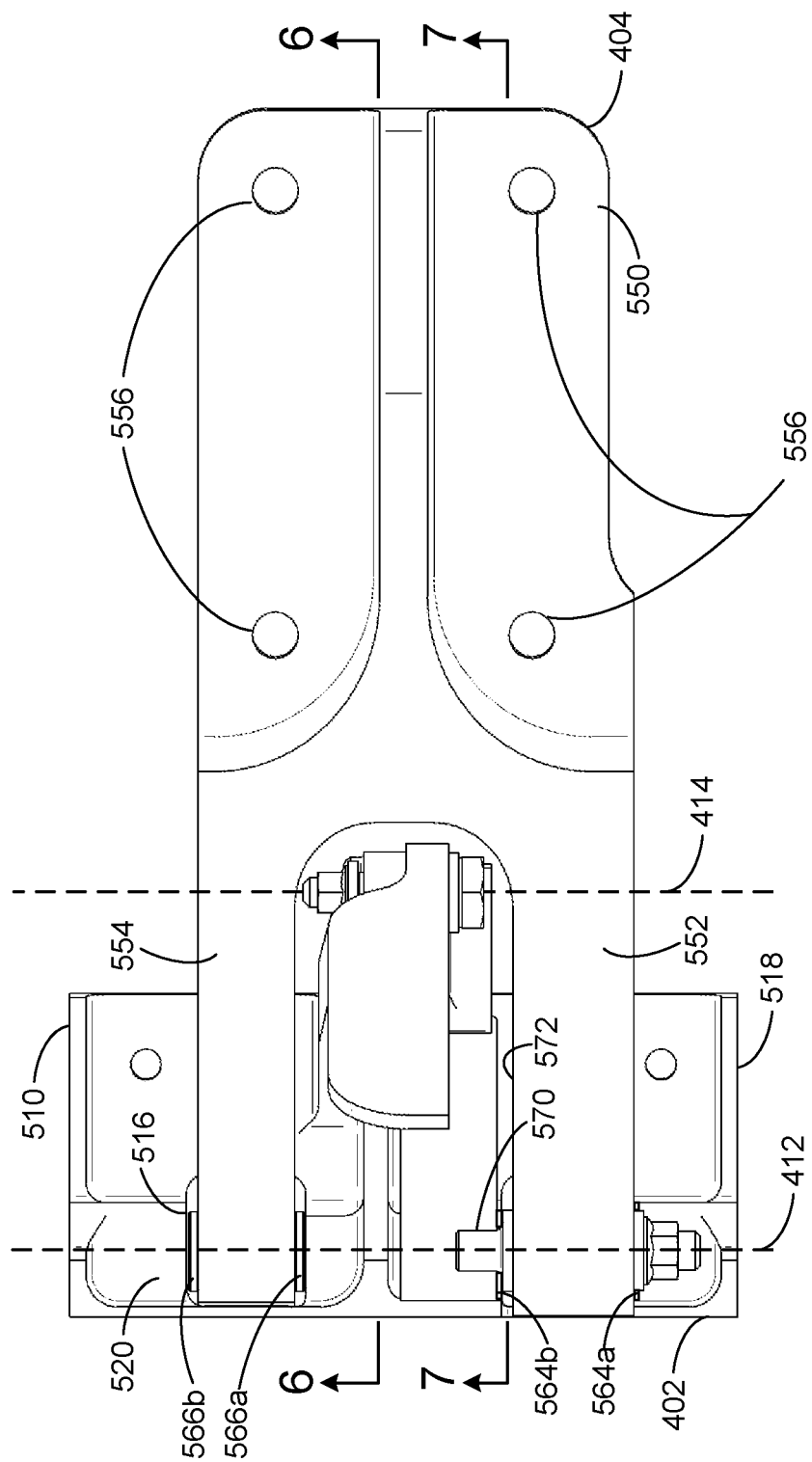
FIG. 5B is a top view of the example locking hinge of FIGS. 4 and 5A.

FIG. 5A is an exploded view of the example locking hinge of FIG. 4. FIG. 5B is a top view of the example locking hinge of FIG. 4. Referring to FIGS. 5A and 5B, the hinge base 402 of the illustrated example includes a first flange 502 and a second flange 504. The first flange 502 of the illustrated example is substantially perpendicular relative to the second flange 504. As used herein, the term substantially perpendicular means approximately perpendicular and/or perfectly perpendicular. For example, the first flange 502 is positioned at approximately a 90-degree angle (e.g., between an 85-degree and 105-degree angle) relative to the second flange 504. Additionally, the hinge base 402 of the illustrated example includes an intermediate wall 506 positioned between a first side 508 of the hinge base 402 and a second side 510 of the hinge base 402 opposite the first side 508. For example, the intermediate wall 506 of the illustrated example may be positioned at a midpoint of a longitudinal length 512 between the first side 508 and the second side 510. The intermediate wall 506 of the illustrated example protrudes from the first flange 502 and the second flange 504. In some examples, the first flange 502 and/or the second flange 504 provides means for attaching to the frame 212.

To receive the hinge gooseneck 404, the hinge base 402 of the illustrated example includes a first slot 514 (FIG. 5A) and a second slot 516 (FIG. 5B). The first slot 514 of the illustrated example is positioned between the intermediate wall 506 and the first side 508 and the second slot 516 of the illustrated example is positioned between the intermediate wall 506 and the second side 510. Specifically, the first slot 514 and the second slot 516 of the illustrated example are formed in the first flange 502 and the second flange 504. The first slot 514 of the illustrated example is located between supporting walls 518 (FIG. 5A). The second slot 516 of the illustrated example is located between supporting walls 520 (FIG. 5B). To pivotally couple the hinge gooseneck 404 and the hinge base 402, the hinge base 402 of the illustrated example includes an aperture 524. The aperture 524 of the illustrated example extends between the first side 508 and the second side 510 (e.g., through the supporting walls 518 and 520). The aperture 524 of the illustrated example is to receive a fastener (e.g., a pin) to couple the hinge gooseneck 404 and the hinge base 402.

To pivotally couple the lever 408 and the hinge base 402, the hinge base 402 of the illustrated example includes a hub 526. The hub 526 of the illustrated example is provided by (e.g., projects from) the intermediate wall 506. The hub 526 of the illustrated example includes an aperture 528 to receive a fastener 530 that pivotally couples the lever 408 and the hinge base 402. To pivotally couple the lever 408 relative to the hinge base 402, the fastener 530 of the illustrated example includes a threaded portion 530a and a non-threaded portion 530b (e.g., a smooth portion, a shaft or a shank). A nut 532 threadably engages the threaded portion 530a of the fastener 530 to couple the lever 408 and the hinge base 402. The lever 408 of the illustrated example rotates about the non-threaded portion 530b of the fastener 530. To limit rotation of the lever 408 relative to the hinge base 402, the hub 526 of the illustrated example includes a first travel stop 536 and a second travel stop 538. To mount the biasing element 410 to the hinge base 402, the hinge base 402 of the illustrated example includes a spring seat 540. Specifically, the spring seat 540 receives a first portion 542 (e.g., a first end) of the biasing element 410. The spring seat 540 and the portion 542 of the biasing element 410 of the illustrated example include apertures 544 to receive fasteners that attach the biasing element 410 to the spring seat 540. A second portion 546 (e.g., a second end) of the biasing element 410 is coupled to or engages the lever 408.

The hinge gooseneck 404 of the illustrated example includes a mounting plate 550, a first arm 552 and a second arm 554. The mounting plate 550 of the illustrated example couples or attaches to the door 206. For example, the mounting plate 550 of the illustrated example includes one or more holes 556 to receive fasteners (e.g., screws, bolts, etc.) to attach the hinge gooseneck 404 to the door 206. In some examples, the mounting plate 550 provides means for attaching to the door 206.

The first arm 552 and the second arm 554 of the illustrated example project from the mounting plate 550. To receive at least a portion of the intermediate wall 506 of the hinge base 402, the first arm 552 of the illustrated example is spaced from the second arm 554 to define a gap 558. The first arm 552 of the illustrated example includes a first portion or first leg 560 and the second arm 554 of the illustrated example includes a second portion or second leg 562. The first leg 560 projects downwardly from the first arm 552 in the orientation of FIGS. 5A and 5B and the second leg 562 projects downwardly from the second arm 554 in the orientation of FIGS. 5A and 5B. The first arm 552 and the first leg 560 and the second arm 554 and the second leg 562 of the illustrated example form an L-shaped profile. For example, the first arm 552 provides a horizontal structure and the first leg 560 provides a vertical structure projecting from the horizontal structure, where the first arm 552 has a longitudinal length that is greater than a longitudinal length of the first leg 560. Similarly, for example, the second arm 554 provides a horizontal structure and the second leg 562 provides a vertical structure projecting from the horizontal structure, where the second arm 554 has a longitudinal length that is greater than a longitudinal length of the second leg 562. To enable pivotal movement of the hinge gooseneck 404 relative to the hinge base 402, the first leg 560 includes first bushings 564a and 564b (e.g., back-to-back bushings) and the second leg 562 includes second bushings 566a and 566b (e.g., back-to-back bushings). For example, the bushing 564a is coupled to a first side of the first leg 560 and the bushing 564b is coupled to a second side of the first leg 560 opposite the first side. Likewise, the bushing 566a is coupled to a first side of the second leg 562 and the bushing 566b is coupled to a second side of the second leg 562 opposite the first side. Specifically, a portion of the first leg 560 housing or carrying the first bushings 564a-b is positioned in the first slot 514 of the hinge base 402, and a portion of the second leg 562 housing or carrying the second bushings 566a-b is positioned in the second slot 516 of the hinge base 402. The first bushings 564a-b and the second bushings 566a-b include respective apertures 568 that align with the aperture 524 of the hinge base 402 when the hinge gooseneck 404 is coupled to the hinge base 402 to define the first pivot axis 412.

To activate the lock assembly 406, the hinge gooseneck 404 of the illustrated example employs a protrusion 570. Specifically, the protrusion 570 of the illustrated example extends from a side surface 572 (e.g., an inner surface) of the first arm 552 in a direction toward the second arm 554 that is substantially parallel relative to the first pivot axis 412 and/or the second pivot axis 414. In particular, the protrusion 570 of the illustrated example is a pin coupled to the first arm 552 via a fastener 574 (e.g., a nut). For example, the fastener 574 threadably couples to the pin. In some examples, the protrusion 570 may be integrally formed with the hinge gooseneck 404 as a unitary structure or piece. In some examples, the protrusion 570 provides means for activating the lock assembly 406. In some examples, the protrusion 570 may be positioned on the first leg 560 and/or at an interface between the first leg 560 and the first arm 552. The protrusion 570 of the illustrated example has a longitudinal axis that is substantially parallel to the first pivot axis 412 and/or the second pivot axis 414.

The lever 408 of the illustrated example pivotally couples to the hub 526 of the hinge base 402. The lever 408 of the illustrated example includes a handle 576 having an aperture 578 to align with the aperture 528 of the hub 526 and receive the fastener 530 to define the second pivot axis 414. To implement the lock assembly 406, the lever 408 of the illustrated example includes a cam 580. The cam 580 of the illustrated example extends (e.g., downwardly) from the handle 576 and provides a cam surface 582. Specifically, the cam surface 582 of the illustrated example is offset relative to an outer surface or edge 576a of the handle 576. The cam surface 582 of the illustrated example includes an arcuate profile or shape. The cam 580 of the illustrated example includes a recess 584 adjacent an end 586 of the cam surface 582. As described in greater detail below, the protrusion 570 of the hinge gooseneck 404 is aligned with the cam surface 582 defined by the cam 580 of the lever 408.

Figure 6:
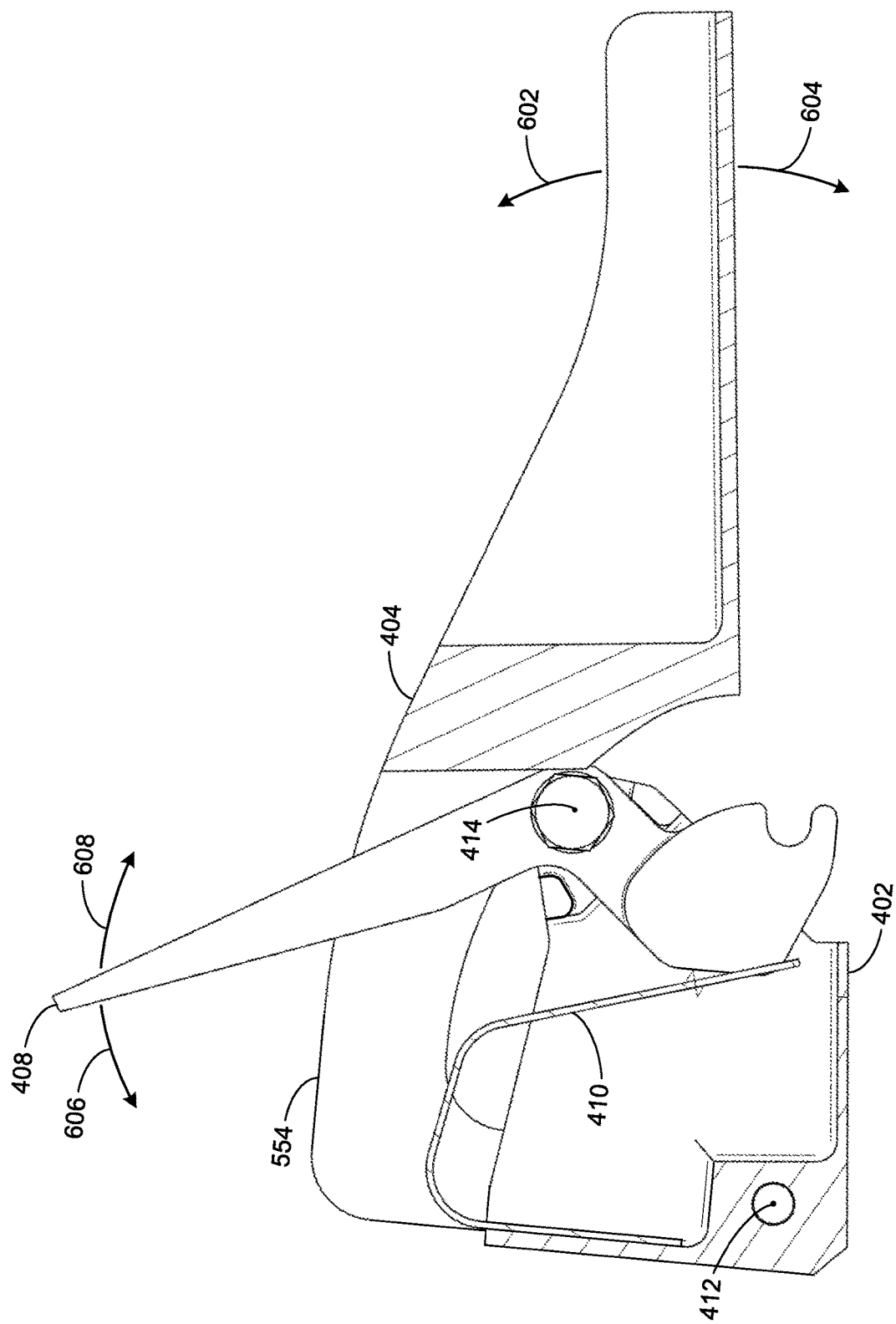
FIG. 6 is a cross-sectional side view of the example locking hinge of FIG. 5A taken along line 6-6 of FIG. 5B.

FIG. 6 is a cross-sectional view of the example locking hinge 302 taken along line 6-6 of FIG. 5B. The hinge gooseneck 404 of the illustrated example rotates about the first pivot axis 412 in a first rotational direction 602 and a second rotational direction 604 opposite the first rotational direction 602 relative to the hinge base 402 and/or the lever 408. Similarly, the lever 408 of the illustrated example pivots about the second pivot axis 414 in a first rotational direction 606 and a second rotational direction 608 opposite the first rotational direction 606 relative to the hinge base 402 and/or the hinge gooseneck 404. The first rotational directions 602 and 606 are in the counterclockwise direction and the second rotational directions 604 and 608 are in the clockwise direction in the orientation of FIG. 6. The first travel stop 536 of the hub 526 of the illustrated example limits rotational movement of the lever 408 in the first rotational direction 606 and the second travel stop 538 of the hub 526 limits rotational movement of the lever 408 in the second rotational direction 608. The biasing element 410 urges the lever 408 in the first rotational direction 606.

Figure 7A:
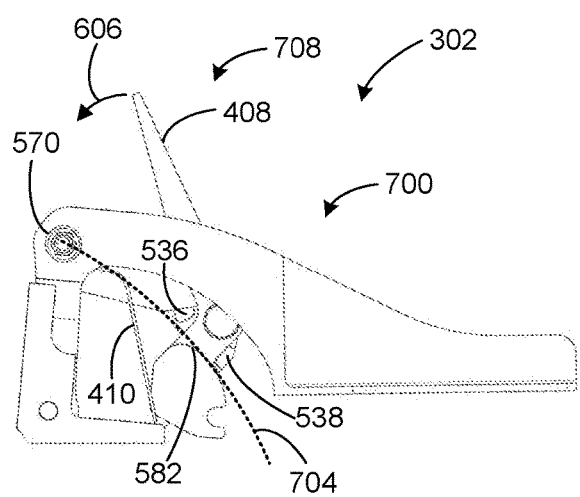
FIGS. 7A-7G are side views at various stages of the example locking hinge of FIGS. 4, 5A and 5B between a closed position and an open position.

FIG. 7A is a side view of the example locking hinge 302 shown in a closed position 700 (e.g., a fully closed position). In the closed position 700, the biasing element 410 urges the lever 408 in the first rotational direction 606 (e.g., the counter-clockwise direction) such that the lever 408 engages the second travel stop 538. As described in FIGS. 7B-7G, the protrusion 570 of the hinge gooseneck 404 follows an arcuate path 704 when the door 206 (e.g., the hinge gooseneck 404) moves between the closed position 700 and an open position 706 (e.g., a fully open position as shown, for example, in FIG. 7F). Specifically, a portion of the arcuate path 704 of the protrusion 570 aligns with (e.g., overlays) the cam surface 582. In the closed position 700, the lever 408 of the illustrated example is biased in the first rotational direction 606 to a first position 708 via the biasing element 410.

FIGS. 7B-7G illustrate the locking hinge 302 at various operational stages when the door 206 moves between the closed position 700 and the open position 706. Additionally, FIGS. 7B-7G are side views of the example locking hinge 302 taken along line 7-7 of FIG. 5B. Thus, the first arm 552 and the first leg 560 of the hinge gooseneck 404 are not shown in FIGS. 7B-7G. However, the protrusion 570 of the hinge gooseneck 404 is shown to illustrate the interaction between the protrusion 570 of the hinge gooseneck 404 and the cam 580 of the lever 408 (e.g., the lock assembly 406).

Figure 7B:
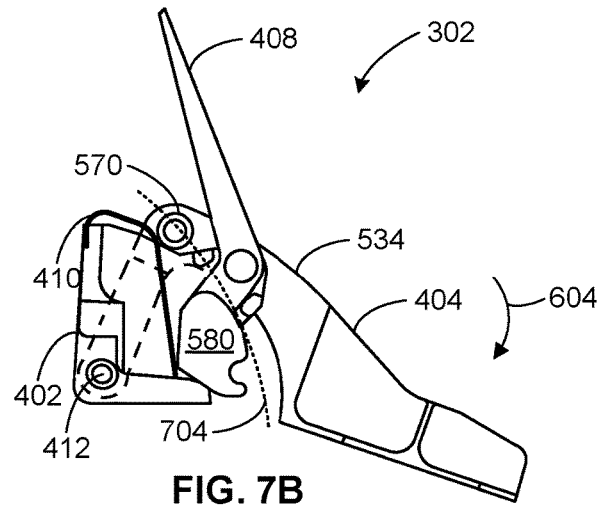
Figure 7C:
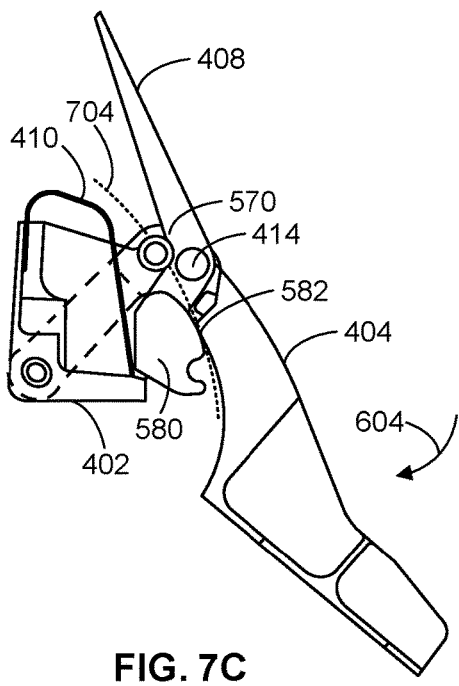

Referring to FIGS. 7B and 7C, to move the door 206 toward the open position 706, the hinge gooseneck 404 rotates in the second rotational direction 604 about the first pivot axis 412 relative to the hinge base 402. As the hinge gooseneck 404 rotates about the first pivot axis 412 in the second rotational direction 604, the protrusion 570 travels or follows the arcuate path 704 and moves in a direction toward the cam 580 of the lever 408. The lever 408 remains in the first position 708 via the biasing element 410 until the protrusion 570 engages the cam surface 582 of the cam 580. The biasing element 410 does not interfere with the protrusion 570 as the protrusion 570 moves along the arcuate path 704.

Figure 7D:
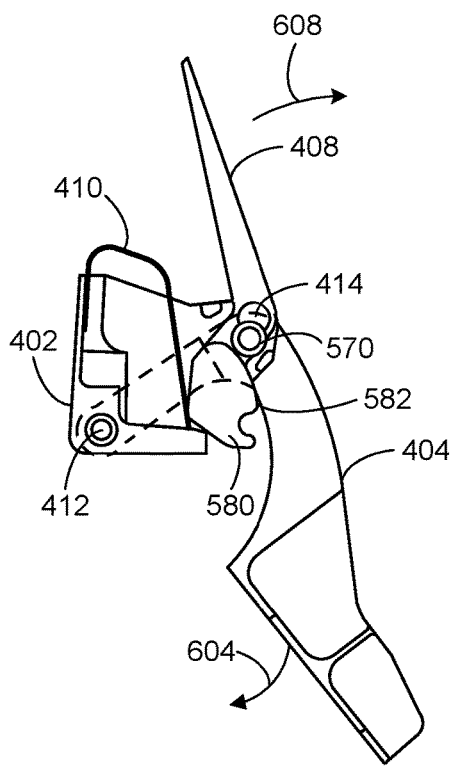
Figures 7E, 7F, 7G:
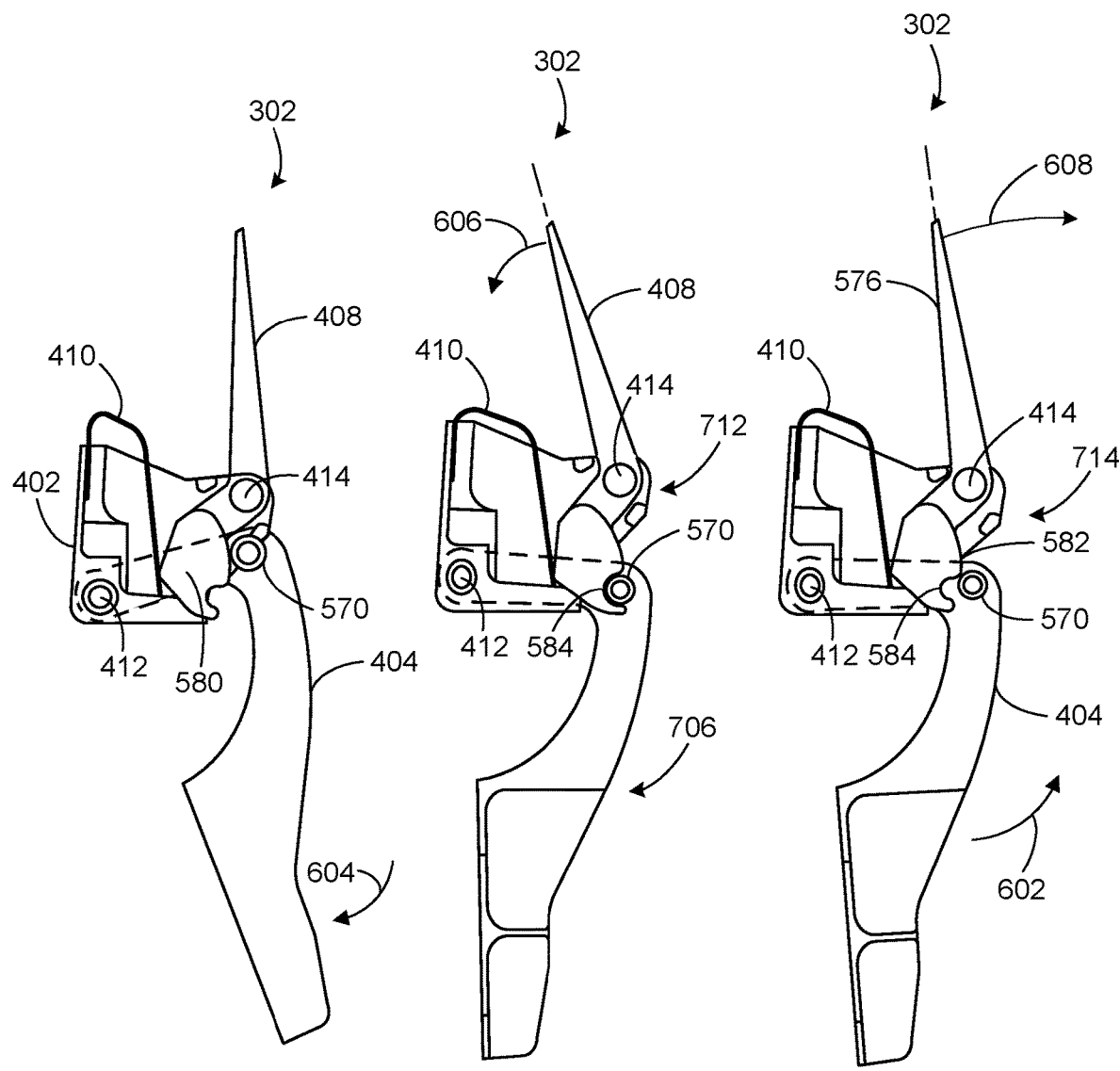

Referring to FIGS. 7D and 7E, as the hinge gooseneck 404 continues to rotate in the second rotational direction 604 about the first pivot axis 412 to move the door 206 to a fully open position, the protrusion 570 engages the cam surface 582 of the cam 580. For example, the protrusion 570 of the hinge gooseneck 404 engages the cam surface 582 when the hinge gooseneck 404 (e.g., the door 206) is approaching the open position 706. In other words, the protrusion 570 of the hinge gooseneck 404 of the illustrated example rides over the cam surface 582 of the lever 408 along a portion of a travel path of the door 206 when the door 206 rotates between the closed position 700 and the open position 706. In turn, the protrusion 570 causes the lever 408 to rotate about the second pivot axis 414 in the second rotational direction 608. In other words, engagement between the protrusion 570 and the cam surface 582 causes the lever 408 to rotate against a force of the biasing element 410. In some examples, the first travel stop 536 may limit rotation of the lever 408 in the second rotational direction 608 (e.g., the clockwise direction).

Referring to FIG. 7F, when the hinge gooseneck 404 is in the open position 706 (e.g., the fully open position), the protrusion 570 of the hinge gooseneck 404 aligns with the recess 584 of the cam 580 of the lever 408. When the protrusion 570 aligns with the recess 584 of the cam 580 such that the protrusion 570 is no longer in engagement with the cam surface 582, the biasing element 410 causes the lever 408 to rotate in the first rotational direction 606. For example, when door 206 is in fully open position, the biasing element 410 imparts a force on the cam 580 to cause the lever 408 to rotate in the first rotational direction 606 to entrap the protrusion 570 in the recess 584 of the lever 408. As a result, engagement between the recess 584 and the protrusion 570 causes the lock assembly 406 to move to a locked position 712. In other words, engagement between the recess 584 and the protrusion 570 of the hinge gooseneck 404 locks rotational movement of the hinge gooseneck 404 relative to the hinge base 402. In other words, the lock assembly 406 prevents rotation of the hinge gooseneck 404 relative to the hinge base 402 in the first rotational direction 602 and the second rotational direction 604. Thus, the lock assembly 406 of the illustrated example prevents the door 206 (e.g., the hinge gooseneck 404) from moving in the first rotational direction 602 toward the closed position 700 shown in FIG. 7A. The lock assembly 406 of the illustrated example maintains the door 206 (e.g., the hinge gooseneck 404) in the open position 706 absent any other support from another structure or from personnel (e.g., an operator). Additionally, the lock assembly 406 of the illustrated example maintains the hinge gooseneck 404 (e.g., the door 206) in the open position 706 under all anticipated load conditions (e.g., wind gusts, etc.). In some examples, the lock assembly 406 provides means for locking pivotal movement of the door 206 relative to the frame 212 when the door 206 is in the open position 706. In some examples, the lock assembly 410 locks pivotal movement of the door 206 relative to the frame 212. In some examples, the lock assembly 406 includes the lever 408, the biasing element 410, the cam 580 and the protrusion 570.

Referring to FIG. 7G, the lock assembly 406 of the illustrated example is in a release position 714. To release the lock assembly 406 to allow movement of the hinge gooseneck 404 toward the closed position 700, the lever 408 is moved in the second rotational direction 608 to cause the recess 584 to release or disengage the protrusion 570. For example, to unlatch the lock assembly 406, an operator pulls back on the handle 576 to release the protrusion 570 and close the door 206. In the locked position, the lever 408 is spaced from the first travel stop 536 so that the lever 408 can be rotated in the second rotational direction 608 to unlatch or decouple the recess 584 from the protrusion 570. In some examples, the first travel stop 536 may limit rotation of the lever 408 in the second rotational direction 608 (e.g., the clockwise direction) when the lever is rotated in the second rotational direction 608 to unlatch the recess 584 from the protrusion 570. When the recess 584 disengages the protrusion 570 (e.g., the protrusion 570 is completely positioned outside of the recess 584), the hinge gooseneck 404 can be rotated in the first rotational direction 602 about the first pivot axis 412. The protrusion 570 follows the arcuate path 704 until the hinge gooseneck 404 is in the fully closed position 700 as shown, for example, in FIG. 7A.

Figure 8:
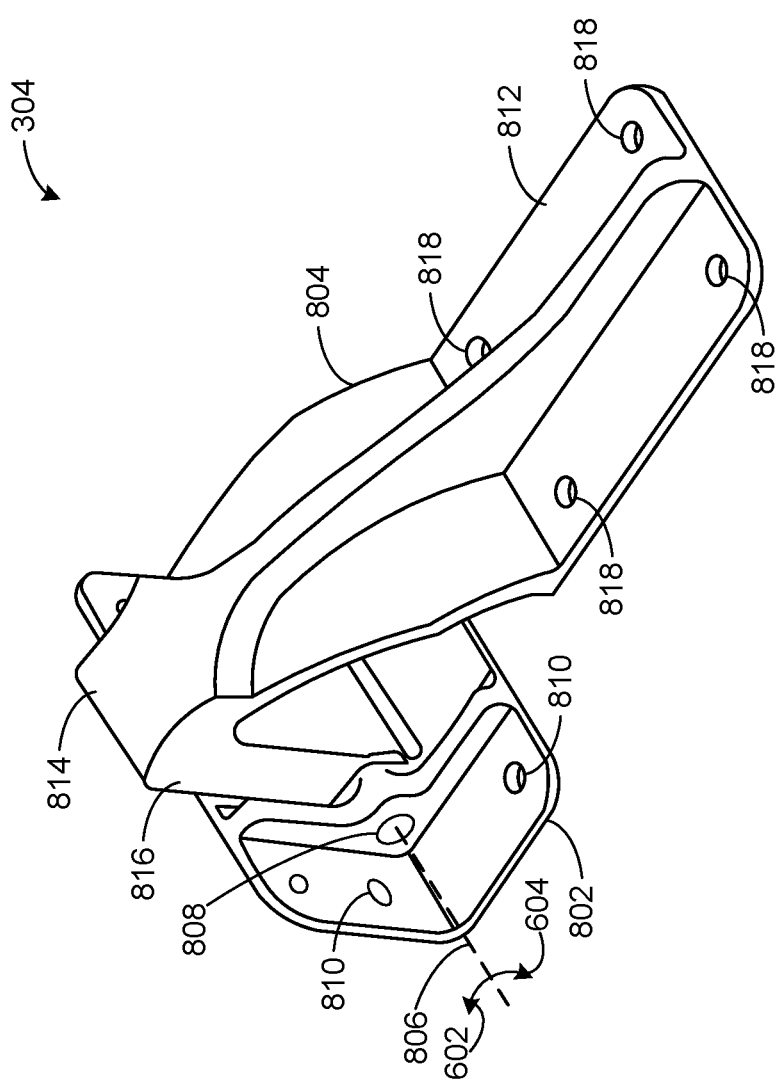
FIG. 8 is a perspective view of an example non-locking hinge of the example hinges of FIG. 3.

FIG. 8 is a perspective view of the non-locking hinge 304 of FIG. 3. The non-locking hinge 304 of the illustrated example includes a hinge base 802 and a hinge gooseneck 804 pivotally coupled to the hinge base 802 about a pivot axis 806. The hinge base 802 includes an aperture 808 to receive a fastener (e.g., a pin) that pivotally couples the hinge gooseneck 804 and the hinge base 802. To couple to the frame 212 of the aircraft 100, the hinge base 802 of the illustrated example includes one or more mounting apertures 810 to receive fasteners (e.g., bolts, screws, rivets, etc.) The hinge gooseneck 804 of the illustrated example includes a mounting plate 812 to couple or attach the hinge gooseneck 804 to the door 206 and an arm 814 to couple the hinge gooseneck 804 to the hinge base 802. The arm 814 of the illustrated example includes a leg 816 that supports a bushing that enables pivotal movement of the hinge gooseneck 804 relative to the hinge base 802 in the first rotational direction 602 and the second rotational direction 604. To couple to the door 206, the mounting plate 812 of the hinge gooseneck of the illustrated example includes one or more mounting apertures 818 to receive fasteners (e.g., bolts, screws, rivets, etc.).

Figure 9:
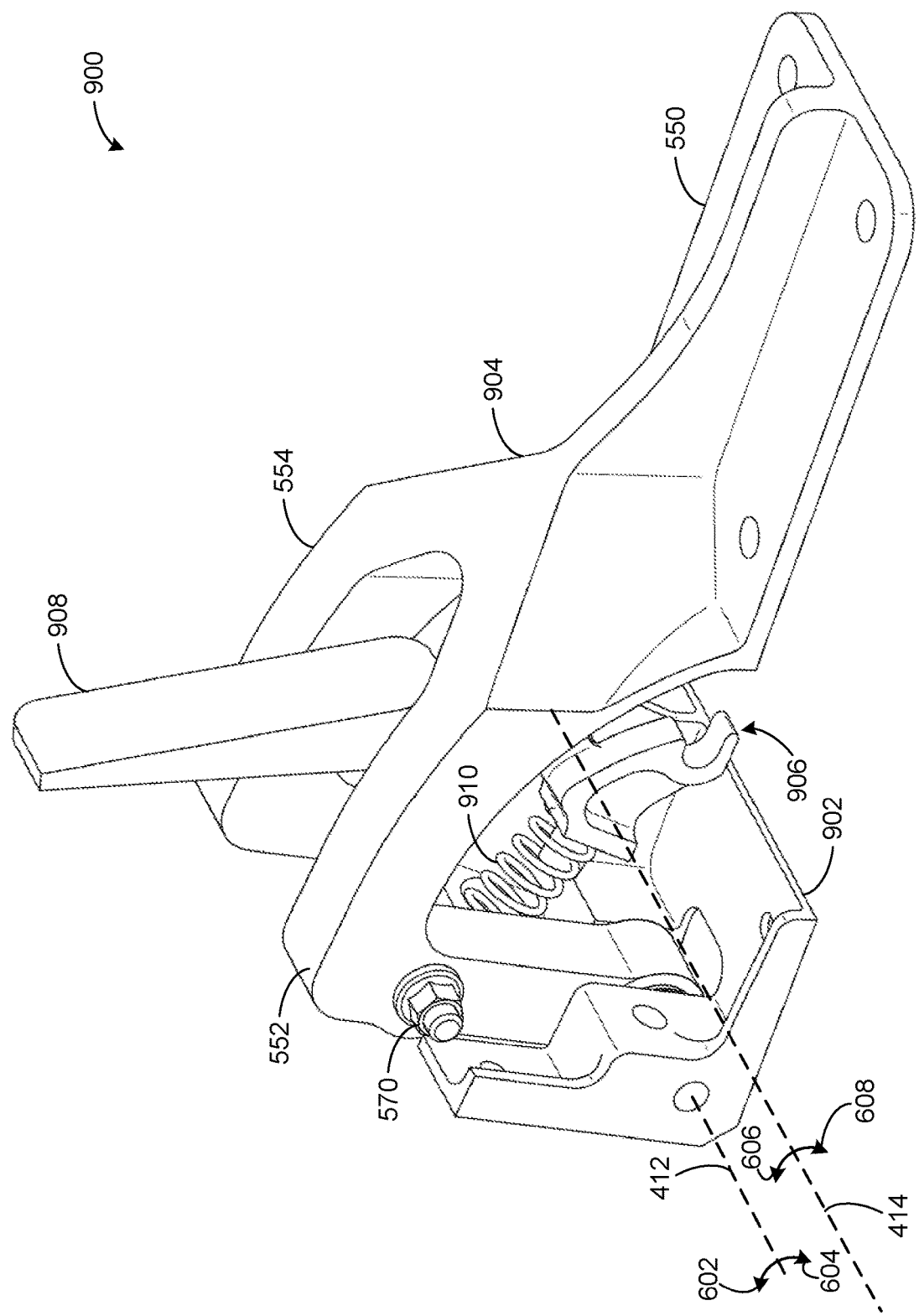
FIG. 9 is a perspective view of another example locking hinge disclosed herein.

FIG. 9 is a perspective, assembly view of another example locking hinge 900 disclosed herein. Those components of the example locking hinge 900 of FIG. 9 that are substantially similar or identical to the components of the example locking hinge 400 of FIGS. 4, 5A, 5B, 6, and 7A-7G described above and that have functions substantially similar or identical to the functions of those components will not be described in detail again below. Instead, the interested reader is referred to the above corresponding descriptions. To facilitate this process, similar or identical reference numbers will be used for like structures.

The locking hinge 900 of the illustrated example is substantially similar to the locking hinge 302 discussed above except that a biasing element 910 of the lock assembly 906 of the illustrated example is in the form of a coil spring instead of the leaf spring. For example, the locking hinge 900 of the illustrated example includes a hinge base 902, a hinge gooseneck 904, and a lock assembly 906. The lock assembly 906 of the illustrated example includes a lever 908 and the biasing element 910. The hinge gooseneck 904 of the illustrated example is substantially similar or identical to the hinge gooseneck 404 of FIG. 4. For example, the hinge gooseneck 904 includes the mounting plate 550, the first arm 552, the second arm 554, the first leg 560 and the second leg 562, the first bushings 564a-b (FIG. 10A), the second bushings 566a-b (FIG. 10A), and the protrusion 570. The hinge gooseneck 904 of the illustrated example pivots relative the hinge base 902 about the first pivot axis 412 in the first rotational direction 602 and the second rotational direction 604. Similarly, the lever 908 of the illustrated example pivots relative to the hinge base 902 about the second pivot axis 414 in the first rotational direction 606 and the second rotational direction 608.

Figure 10A:
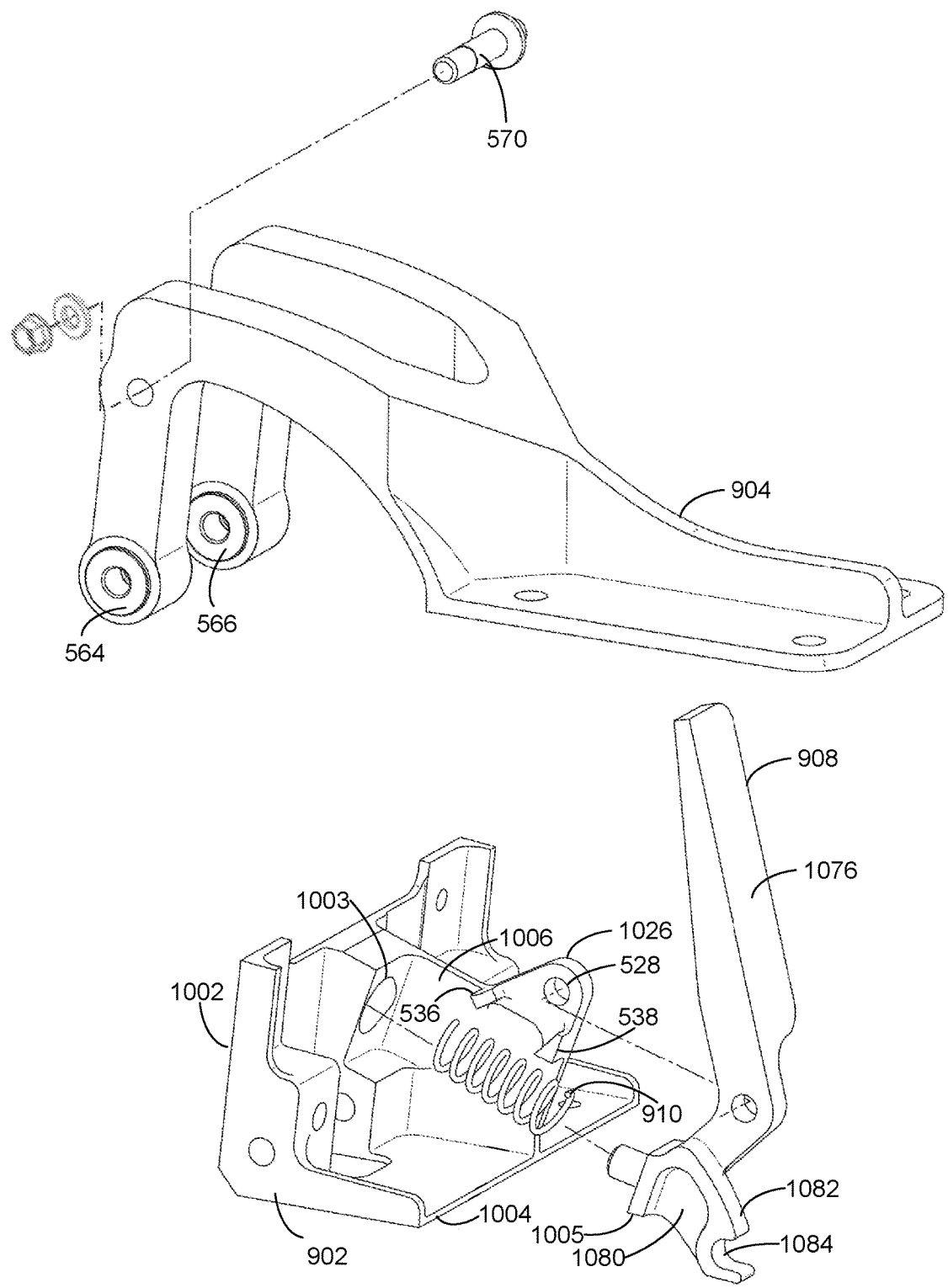
FIG. 10A is an exploded view of the example locking hinge of FIG. 9A.
Figure 10B:
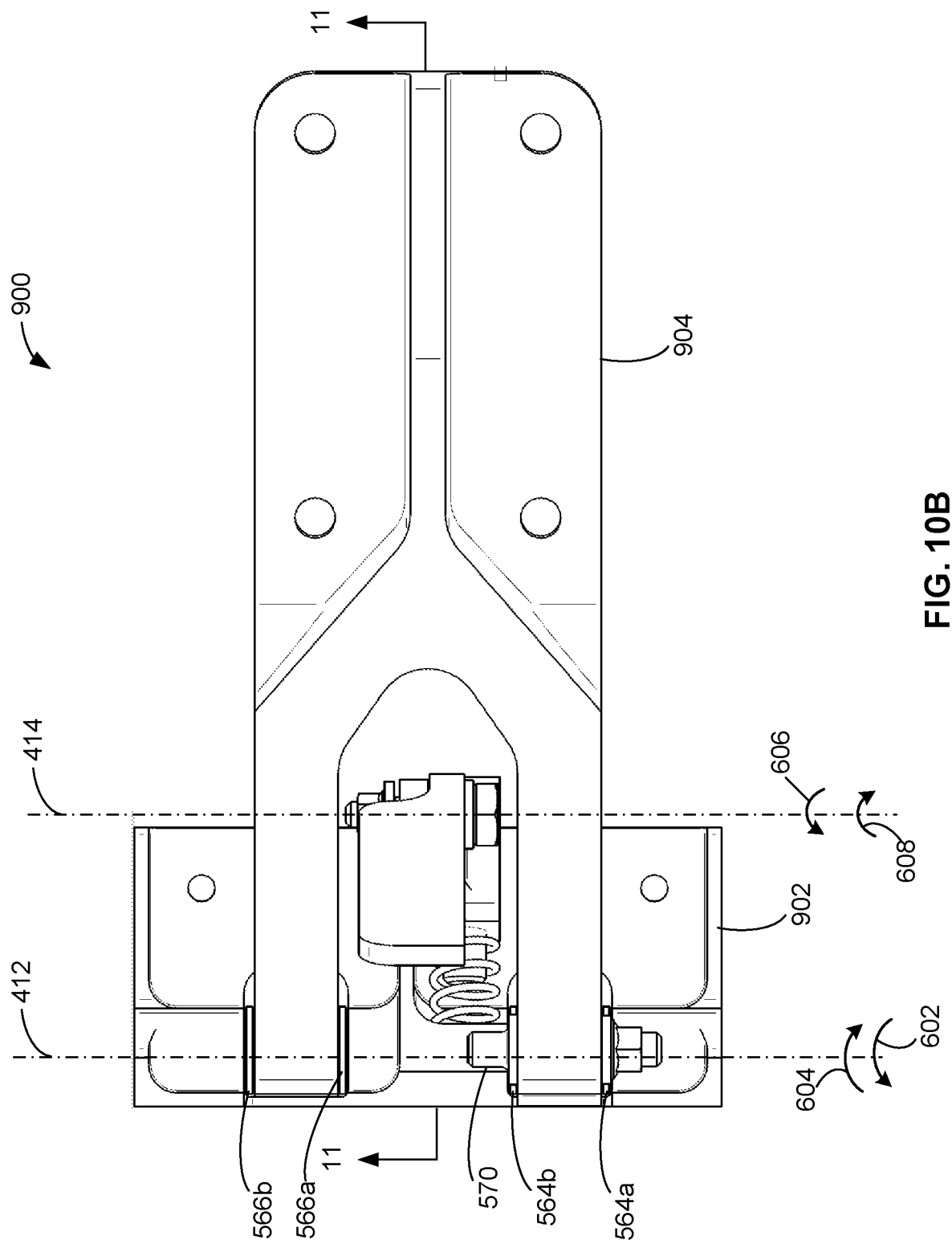
FIG. 10B is a top view of the example locking hinge of FIGS. 9A and 9B.

FIG. 10A is an exploded view of the example locking hinge 900 of FIG. 9. FIG. 10B is a top view of the example locking hinge 900 of FIG. 9. Referring to FIGS. 10A and 10B, the hinge base 902 of the illustrated example includes a first flange 1002, a second flange 1004, an intermediate wall 1006 and a hub 1026, which includes the first travel stop 536, the second travel stop 538 and the aperture 528. The lever 908 of the illustrated example includes a handle 1076 and a cam 1080 defining a cam surface 1082 and a recess 1084 to interact with (e.g., engage) the protrusion 570 of the hinge gooseneck 904. To accommodate the biasing element 910, the hinge base 902 of the illustrated example includes a first spring seat 1003 and the lever 908 of the illustrated example includes a second spring seat 1005.

Figure 11:
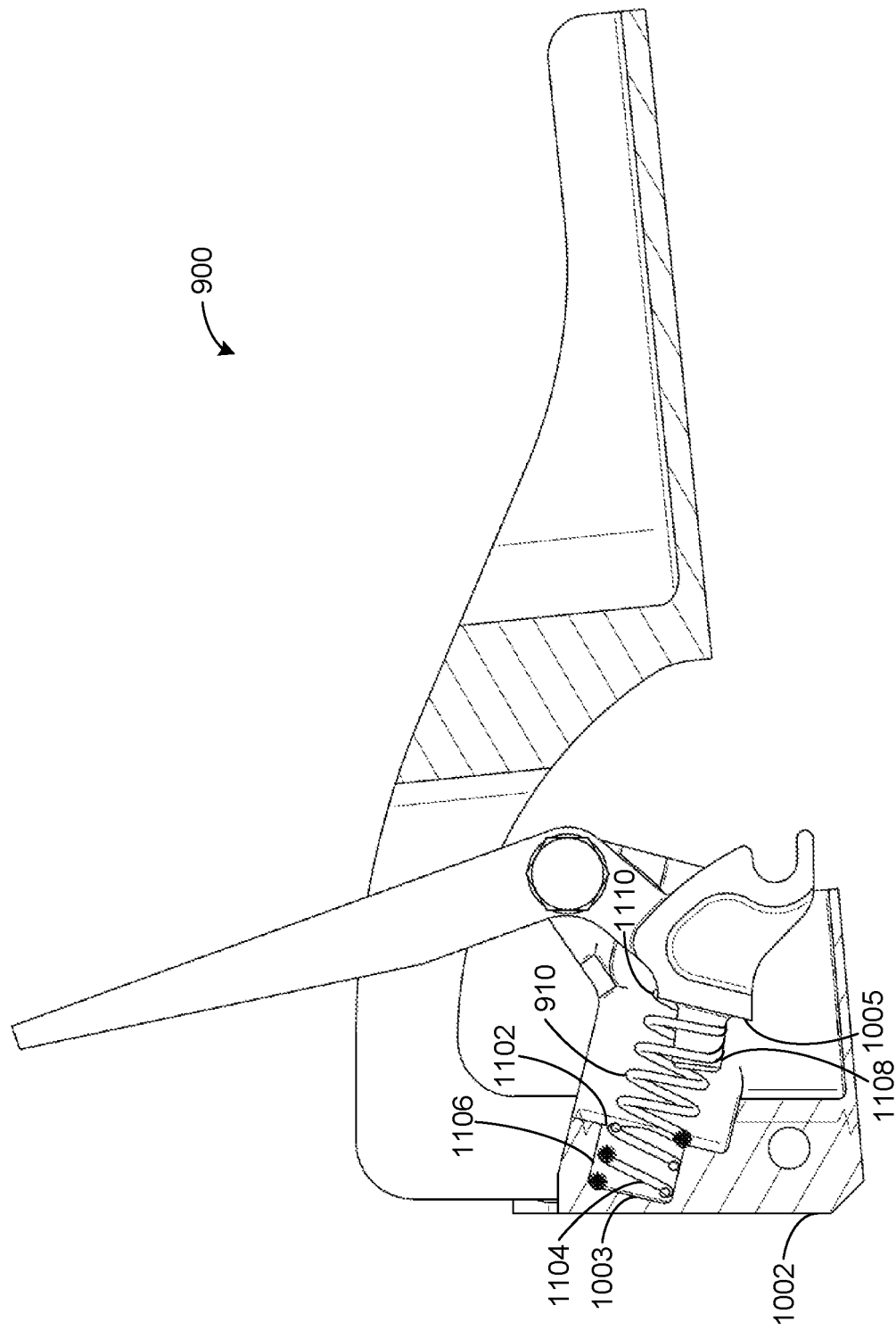
FIG. 11 is a cross-sectional view of the example locking hinge of FIGS. 9, 10A, and 10B taken along line 11-11 of FIG. 10B.

FIG. 11 is a cross-sectional view of the example locking hinge of FIGS. 9, 10A and 10B taken along line 11-11 of FIG. 10B. The biasing element 910 of the illustrated example is captured between the first spring seat 1003 and the second spring seat 1005. Specifically, the first spring seat 1003 includes an aperture 1102 to receive a first end 1104 (e.g., at least a portion) of the biasing element 910. A side wall 1106 defined by the aperture 1102 helps guide or maintain alignment of the biasing element 910 relative to the first spring seat 1003. Additionally, to maintain alignment of the biasing element 910 relative to the second spring seat 1005, the lever 908 of the illustrated example includes a protrusion 1108 to receive a second end 1110 of the biasing element 910. The protrusion 1108 of the illustrated example extends from the second spring seat 1005. Specifically, the protrusion 1108 of the illustrated example extends in a direction toward the first spring seat 1103 and/or the first flange 1002. The locking hinge 900 of the illustrated example operates in the same manner as the operation of the locking hinge 302 of FIGS. 3, 4, 5A, 5B, 6, and 7A-7G.

Figure 12:
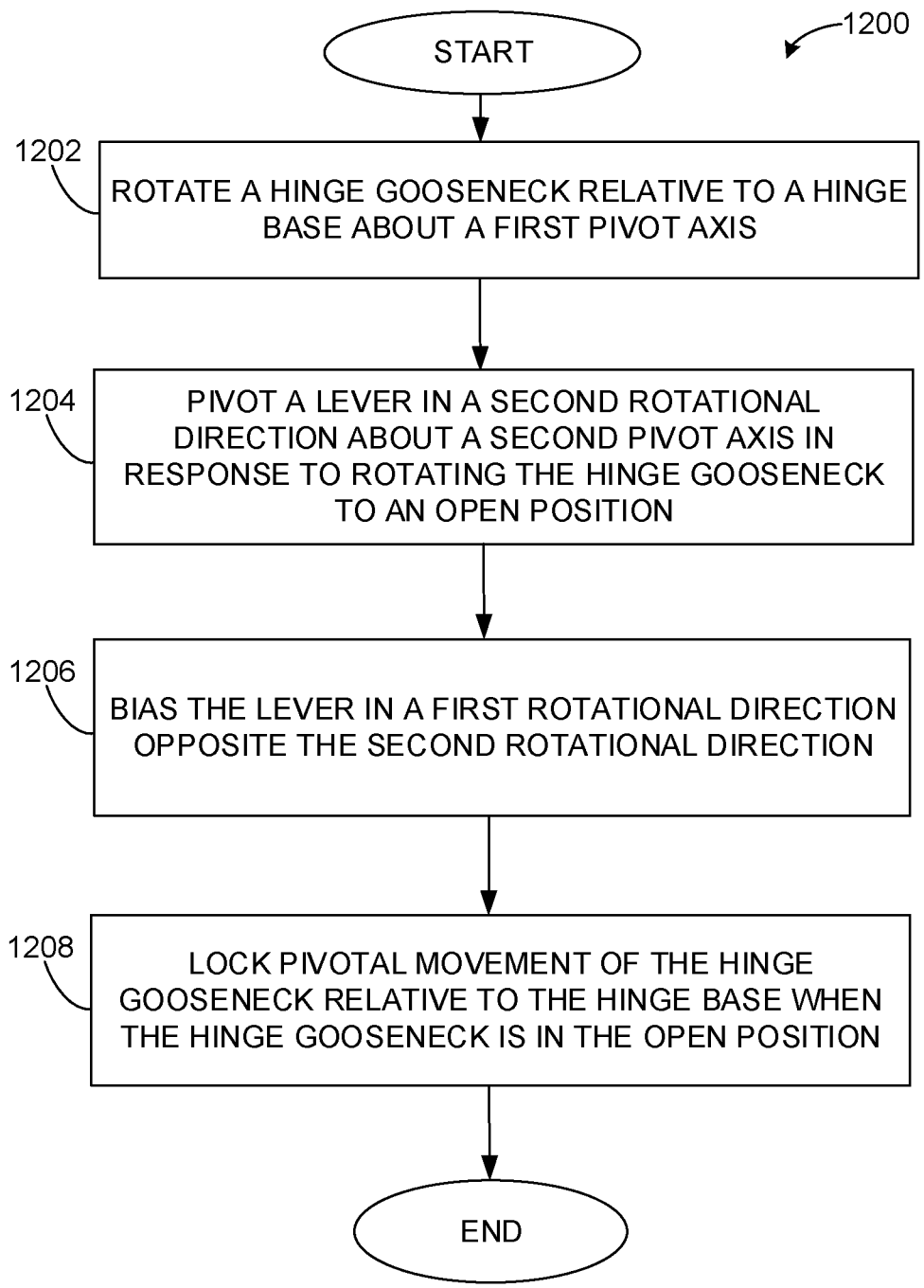
FIG. 12 is a flowchart of an example method of operating an example latching hinge apparatus disclosed herein.

FIG. 12 is a flowchart of an example method 1200 of operating an example latching hinge apparatus disclosed herein such as, for example, the latching hinge apparatus 302 of FIGS. 4, 5A, 5B and 6-8 and the example latching hinge apparatus 900 of FIGS. 9, 10A, 10B and 11. While the example method 1200 is disclosed in FIG. 12, one or more of the blocks and/or processes illustrated in FIG. 12 may be combined, divided, re-arranged, omitted, eliminated and/or implemented in any other way. Further still, the example method of FIG. 12 may include one or more processes and/or blocks in addition to, or instead of, those illustrated in FIG. 12, and/or may include more than one of any or all of the illustrated processes and/or blocks. Although the example method 1200 is described with reference to the flowchart illustrated in FIG. 12, many other methods of operating an example fuel tank assembly may alternatively be used.

The method begins at block 1202 when the hinge gooseneck 404, 904 rotates relative to the hinge base 402, 902 about the first pivot axis 412. For example, the hinge gooseneck 404, 904 rotates in the first rotational direction 602 about the first pivot axis 412 to move the hinge gooseneck from the closed position 700 to the open position 706. The hinge gooseneck 404, 904 rotates in the second rotational direction 604 about the first pivot axis 412 to move the hinge gooseneck 404, 904 from the open position 706 to the closed position 700.

The lever 408, 908 pivots in the second rotational direction 608 about the second pivot axis 414 in response to rotating the hinge gooseneck 404, 904 to the open position 706 (block 1204). For example, the lever 408, 908 rotates in the second rotational direction 608 in response to rotating the hinge gooseneck 404, 904 in the first rotational direction 602 (e.g., from the closed position to the open position). To pivot the lever 408, 908 in the second rotational direction 608, the protrusion 570 of the hinge gooseneck 404, 904 engages the lever 408, 908 (e.g., the cam 580 or the cam surface 584) as the hinge gooseneck 404, 904 approaches the open position 706. The lever 408, 908 is biased in the first rotational direction 606 about the second pivot axis 414 (block 1206). For example, the biasing element 410, 910 biases or urges the lever 408, 908 in the first rotational direction 606. Pivotal movement of the hinge gooseneck 404, 904 is locked relative to the hinge base 402, 902 when the hinge gooseneck 404, 904 is in the open position 706 (block 1208). For example, the lever 408, 908 is biased in the first rotational direction 606 to cause the recess 584 of the lever 408, 908 to engage the protrusion 570 of the hinge gooseneck 404, 904 to lock pivotal movement of the hinge gooseneck 404, 904 relative to the hinge base 402, 902 when the hinge gooseneck 404, 904 is in the open position 706. To unlock the hinge gooseneck 404, 904 relative to the hinge base 402, 902, the lever is rotated in the second rotational direction 608 to cause the lever 408, 908 to release the protrusion 570 of the hinge gooseneck 404, 904 and allow rotation of the hinge gooseneck 404, 904 in the first rotational direction 602 to move to the closed position 700.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A locking hinge apparatus comprising:
a hinge base structured to couple to a frame of an aircraft;
a hinge gooseneck structured to pivotally couple a door to the hinge base, the hinge gooseneck including a protrusion extending from a surface of the hinge base, the hinge gooseneck to allow the door to move between a closed position and an open position relative to the frame;
a lever pivotally coupled to the hinge base, the lever to pivot relative to the hinge base between a first rotational direction and a second rotational direction opposite the first rotational direction, the lever including a lock and a cam surface adjacent the lock, the lock having a recess to receive the protrusion of the hinge gooseneck when the door is in the open position to lock rotational movement of the door relative to the frame when the door is in the open position and the lock is in a locked condition, wherein the recess and the protrusion are oriented such that an attempt to pivot the hinge gooseneck from the open position toward the closed position when the lock is in the locked condition causes the protrusion to increase a force in a direction toward the recess to prevent movement of the door from the open position towards the closed position, the lever structured to be actuated manually to release the lock to enable rotational movement of the door relative to the frame; and
a biasing element to urge the lever in the first rotational direction.

2. The apparatus of claim 1, wherein the hinge gooseneck is to pivot relative to the hinge base about a first pivot axis and the lever is to pivot relative to the hinge base about a second pivot axis spaced from the first pivot axis.

3. The apparatus of claim 2, wherein the first pivot axis is substantially parallel to the second pivot axis.

4. The apparatus of claim 1, wherein the recess is offset relative to the cam surface and formed adjacent an end of the cam surface.

5. The apparatus of claim 1, wherein the protrusion is a pin.

6. The apparatus of claim 5, wherein the pin has a longitudinal axis that is substantially parallel to a pivot axis of the lever.

7. The apparatus of claim 1, wherein the protrusion is directed toward the recess when the protrusion is located within the recess and the hinge gooseneck is attempted to be rotated toward the closed position.

8. The apparatus of claim 1, wherein the protrusion follows an arcuate path when the hinge gooseneck rotates between the open position and the closed position.

9. The apparatus of claim 1, wherein the protrusion moves toward the recess when the hinge gooseneck moves from the open position toward the closed position.

10. The apparatus of claim 1, wherein the protrusion of the hinge gooseneck only releases the recess when the lever is rotated to move the recess out of engagement with the protrusion.

11. A locking hinge apparatus comprising:
a hinge base structured to couple to a frame of an aircraft;
a hinge gooseneck structured to pivotally couple a door to the hinge base, the hinge gooseneck including a protrusion extending from a surface of the hinge base, the protrusion being a pin, the hinge gooseneck to allow the door to move between a closed position and an open position relative to the frame;
a lever pivotally coupled to the hinge base, the lever to pivot relative to the hinge base between a first rotational direction and a second rotational direction opposite the first rotational direction, the pin having a longitudinal axis substantially parallel to a pivot axis of the lever, the lever including a lock having a recess to receive the pin of the hinge gooseneck when the door is in the open position to lock rotational movement of the door relative to the frame when the door is in the open position and the lock is in a locked condition, the pin to engage a cam surface when the door approaches the open position, wherein the recess and the protrusion are oriented such that an attempt to pivot the hinge gooseneck from the open position toward the closed position when the lock is in the locked condition causes the protrusion to increase a force in a direction toward the recess to prevent movement of the door from the open position towards the closed position, the lever structured to be actuated manually to release the lock to enable rotational movement of the door relative to the frame; and a biasing element to urge the lever in the first rotational direction.

12. The apparatus of claim 11, wherein the pin is to cause the lever to rotate in the second rotational direction when the pin engages the cam surface, wherein the pin is to move toward the recess along the cam surface when the door moves toward the open position.

13. The apparatus of claim 12, wherein the biasing element is to cause the recess to engage the pin when the pin is in alignment with the recess, engagement between the pin and the recess to lock pivotal movement of the door relative to the frame.

14. A locking hinge apparatus comprising:
a hinge base to couple to a frame of an aircraft;
a hinge gooseneck pivotally coupled to the hinge base about a first rotational axis, the hinge gooseneck to couple a door of the aircraft to the hinge base, the gooseneck includes a pin protruding from a surface;
a lock assembly to lock a position of the door in an open position when the door is moved to a fully open position and prevent the door from moving to a closed position, the lock assembly including:
a lever pivotally coupled to the hinge base about a second rotational axis different than the first rotational axis, the lever to pivot relative to the hinge base between a first rotational direction and a second rotational direction opposite the first rotational direction, the lever including a cam surface and a recess, the cam surface to be engaged by the hinge gooseneck when the door approaches the fully open position, the hinge gooseneck to cause the lever to pivot in the second rotational direction when the cam surface is engaged by the hinge gooseneck, the pin of the gooseneck to engage the recess when the door is in the fully open position, the protrusion being orientated relative to the recess when the lock is in a locked condition such that the protrusion increases a force in a direction toward the recess to prevent movement of the gooseneck about the first rotational axis when the pin is positioned within the recess and the gooseneck is attempted to be rotated toward the closed position;
a release structured to be actuated manually to enable movement of the door to the closed position; and
a biasing element to urge the lever toward the first rotational direction.

15. The apparatus of claim 14, wherein the biasing element is at least one of a leaf spring or a coil spring.

16. The apparatus of claim 14, wherein the biasing element includes a first end coupled to the hinge base and a second end coupled to the lever.

17. The apparatus of claim 14, wherein at least one of the hinge base or the hinge gooseneck is machined aluminum.

18. A locking hinge apparatus comprising:
means for pivotally coupling a door to a frame of an aircraft, the means for pivotally coupling including first means for attaching to the door and second means for attaching to the frame, the first means for attaching being pivotally coupled to the second means for attaching to enable rotation of the door relative to the frame between an open position and a closed position;
means for locking to prevent pivotal movement of the door relative to the frame when the door is in the open position and when the means for locking is in a locking position, the means for locking being rotatably coupled to the second means for attaching, the means for locking to rotate relative to the second means for attaching between a first rotational direction and a second rotational direction opposite the first rotational direction
means for activating the means for locking coupled to the first means for attaching, the means for activating to cause the means for locking to rotate in the second rotational direction as the door moves to the open position, the means for locking having a means for guiding the means for activating, the means for guiding having a means for stopping the means for activating when the door is in the open position to lock rotational movement of the door relative to the frame when the door is in the open position and the means for locking is in a locked condition, wherein the means for stopping and the means for activating are oriented such that an attempt to pivot the first means for attaching from the open position toward the closed position when the means for locking is in the locked condition causes the means for activating to increase a force in a direction toward the means for stopping to prevent movement of the door from the open position towards the closed position;
means for releasing the means for locking to enable pivotal movement of the door relative to the frame to a closed position, the means for releasing is structured to be manually engaged by an operator; and
means for biasing the means for locking the pivotal movement toward the second rotational direction, the means for biasing to cause the means for locking to engage the first means for attaching when the door moves to the open position.

19. The apparatus of claim 16, wherein the first means for attaching is to pivot relative to the second means for attaching about a first pivot axis, and the means for locking is to pivot relative to the second means for attaching about a second pivot axis spaced apart from the first pivot axis.

20. The apparatus of claim 18, wherein the means for activating includes a means for following.

21. The apparatus of claim 20, wherein the means for following has a longitudinal axis that is substantially parallel to a pivot axis of the means for locking.

22. The apparatus of claim 21, wherein the means for guiding includes a cam surface, the means for following to engage the cam surface when the door approaches the open position.

23. The apparatus of claim 22, wherein the means for following is to cause the means for locking to rotate in the second rotational direction when the means for following engages the cam surface, wherein the means for following is to move along the cam surface toward the means for stopping when the door moves toward the open position.

* * * * *